US010787841B2

(12) United States Patent
Dyer et al.

(10) Patent No.: US 10,787,841 B2
(45) Date of Patent: Sep. 29, 2020

(54) CABLE RELEASE SYSTEM FOR A HOLD OPEN ROD MECHANISM

(71) Applicant: MarathonNorco Aerospace, Waco, TX (US)

(72) Inventors: Ben Dyer, Waco, TX (US); Neil Christian, Waco, TX (US); Garrett Wise, Waco, TX (US)

(73) Assignee: MarathonNorco Aerospace, Inc., Waco, TX (US)

( * ) Notice: Subject to any disclaimer, the term of this patent is extended or adjusted under 35 U.S.C. 154(b) by 0 days.

(21) Appl. No.: 16/508,546

(22) Filed: Jul. 11, 2019

(65) Prior Publication Data
US 2020/0018096 A1 Jan. 16, 2020

Related U.S. Application Data

(60) Provisional application No. 62/696,518, filed on Jul. 11, 2018.

(51) Int. Cl.
E05B 53/00 (2006.01)
E05B 79/10 (2014.01)
E05C 17/02 (2006.01)
F16C 1/10 (2006.01)
E05B 79/20 (2014.01)
F16C 1/12 (2006.01)
E05C 17/04 (2006.01)
(Continued)

(52) U.S. Cl.
CPC ............ *E05B 53/005* (2013.01); *E05B 79/20* (2013.01); *E05C 17/04* (2013.01); *E05C 17/36* (2013.01); *F16C 1/12* (2013.01); *E05B 81/02* (2013.01)

(58) Field of Classification Search
CPC ........ E05B 53/005; E05B 57/00; E05B 79/20; E05B 81/02; F16C 1/10; F16C 1/12; F16C 1/14; F16C 1/16; F15B 15/26; F15B 15/261; F15B 2015/267; E05C 17/04; E05C 17/30; E05C 17/36
See application file for complete search history.

(56) References Cited

U.S. PATENT DOCUMENTS 6,832,540 B2 * 12/2004 Hart .................... F15B 15/2807
92/24
8,615,846 B2 * 12/2013 Wheeler ................. E05C 17/30
16/82

(Continued)

*Primary Examiner* — Adam D Rogers
(74) *Attorney, Agent, or Firm* — BakerHostetler

(57) ABSTRACT

A cable release system configured to unlock a hold open rod mechanism or latch mechanism includes an actuator having a handle and a cable attachment. The cable release system also includes a cable connected at one end to the actuator and at another end to an unlocking mechanism associated with the hold open rod mechanism or the latch mechanism. The cable release system also includes the actuator being configured to move the cable and operate the unlocking mechanism associated with the hold open rod mechanism or the latch mechanism. The cable release system also includes the actuator and the handle being configured to be moved by personnel to move the cable and operate the unlocking mechanism associated with the hold open rod mechanism or the latch mechanism. The cable release system also includes the cable attachment including a lower slide and a release slide.

20 Claims, 12 Drawing Sheets

(51) Int. Cl.
  *E05C 17/36*   (2006.01)
  *E05B 81/02*   (2014.01)

(56) References Cited

U.S. PATENT DOCUMENTS

| | | | |
|---|---|---|---|
| 8,844,895 B2 * | 9/2014 | Palma | E05C 17/30 |
| | | | 16/49 |
| 8,998,165 B2 * | 4/2015 | Wheeler | E05C 17/30 |
| | | | 248/354.1 |
| 9,067,669 B2 * | 6/2015 | Wheeler | B64C 1/06 |
| 9,464,645 B2 * | 10/2016 | Dyer | F15B 15/261 |
| 9,599,137 B2 * | 3/2017 | Wheeler | F16B 7/1409 |
| 2020/0087001 A1 * | 3/2020 | Dyer | B64D 29/06 |

* cited by examiner

CABLE RELEASE SYSTEM FOR A HOLD OPEN ROD MECHANISM

CROSS-REFERENCE TO RELATED APPLICATIONS

This application claims the benefit from U.S. Provisional Application No. 62/696,518 filed on Jul. 11, 2018, which is hereby incorporated by reference in its entirety for all purposes as if fully set forth herein.

FIELD OF THE DISCLOSURE

The disclosure relates to a cable release system for a hold open rod mechanism. More particularly, the disclosure relates to a remotely operated cable release system for a hold open rod mechanism. The disclosure also relates to a cable release system for a latch mechanism. More particularly, the disclosure relates to a remotely operated cable release system for a latch mechanism.

BACKGROUND OF THE DISCLOSURE

Hold open rods are well known in both the automotive and aviation industries. Hold open rods may be used to hold a component, such as door or hatch, open after the component has been opened manually or automatically. Generally, hold open rods may include two cylindrical, telescoping tubes with an inner tube located inside of an outer tube. Alternatively, hold open rods may include two tubes having a square cross-section, hexagonal cross-section, or the like. In one aspect, a stowed position may be where the inner tube is extended a fraction of the fully extended length from the outer tube. In one aspect, a stowed position may be where the inner tube is extended a large fraction of the fully extended length from the outer tube. In one aspect, a stowed position may be where the inner tube is located almost entirely within the outer tube. When in use, the inner tube may be extended to a designated position in order to hold open the component. In the extended position, the tubes may be locked in place in order to hold the component open with a lock mechanism. The lock mechanism may be used to prevent the inner tube from retracting into the outer tube. A typical hold open rod supports a considerable amount of weight when locked in an open position. Once unlocked, the typical hold open rod allows movement of the component to a closed position.

In some implementations, the hold open rod is configured to hold open a component of considerable size. Moreover, the considerable size of the component places at least portions of the hold open rod at an elevated position that likewise elevates the position of a corresponding unlocking mechanism. The typical unlocking mechanism needs to be directly operated by personnel to unlock the hold open rod. The elevated position of the unlocking mechanism makes it difficult for personnel to reach and operate the unlocking mechanism. Typically, personnel will need to mount a ladder or other structure to reach the unlocking mechanism, which creates a safety hazard for operation of the unlocking mechanism. Moreover, it slows the process of operating the unlocking mechanism to place the component in the closed position.

Accordingly, it is desirable to have a hold open rod with a mechanism that allows personnel to remotely operate the unlocking mechanism.

SUMMARY OF THE DISCLOSURE

In one aspect of the disclosure, a cable release system configured to unlock a hold open rod mechanism or latch mechanism includes an actuator having a handle and a cable attachment. The cable release system also includes a cable connected at one end to the actuator and at another end to an unlocking mechanism associated with the hold open rod mechanism or the latch mechanism. The cable release system also includes the actuator configured to move the cable and operate the unlocking mechanism associated with the hold open rod mechanism or the latch mechanism. The cable release system also includes the actuator and the handle being configured to be moved by personnel to move the cable and operate the unlocking mechanism associated with the hold open rod mechanism or the latch mechanism. The cable release system also includes an actuation shaft connected to the handle and further connected to the cable attachment. The cable release system also includes the cable attachment including a lower slide and a release slide. The cable release system also includes the cable attachment, the lower slide, and the release slide configured to securely attach to the cable. The cable release system also includes the release slide configured to move in a first direction with respect to the lower slide in order to release the cable.

In one aspect of the disclosure, a cable release system configured to unlock a hold open rod mechanism or latch mechanism includes an actuator having a handle and a cable attachment. The cable release system also includes a cable connected at one end to the actuator and at another end to an unlocking mechanism associated with the hold open rod mechanism or the latch mechanism. The cable release system also includes the actuator configured to move the cable and operate the unlocking mechanism associated with the hold open rod mechanism or the latch mechanism. The cable release system also includes the actuator and the handle being configured to be moved by personnel to move the cable and operate the unlocking mechanism associated with the hold open rod mechanism or the latch mechanism. The cable release system also includes an actuation shaft connected to the handle and further connected to the cable attachment. The cable release system also includes the cable attachment including a lower slide and a release slide. The cable release system also includes the cable attachment, the lower slide, and the release slide configured to securely attach to the cable. The cable release system also includes the release slide configured to move in a first direction with respect to the lower slide in order to release the cable. The cable release system also includes the release slide being further configured to move in a second direction with respect to the lower slide in order to securely hold the cable.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
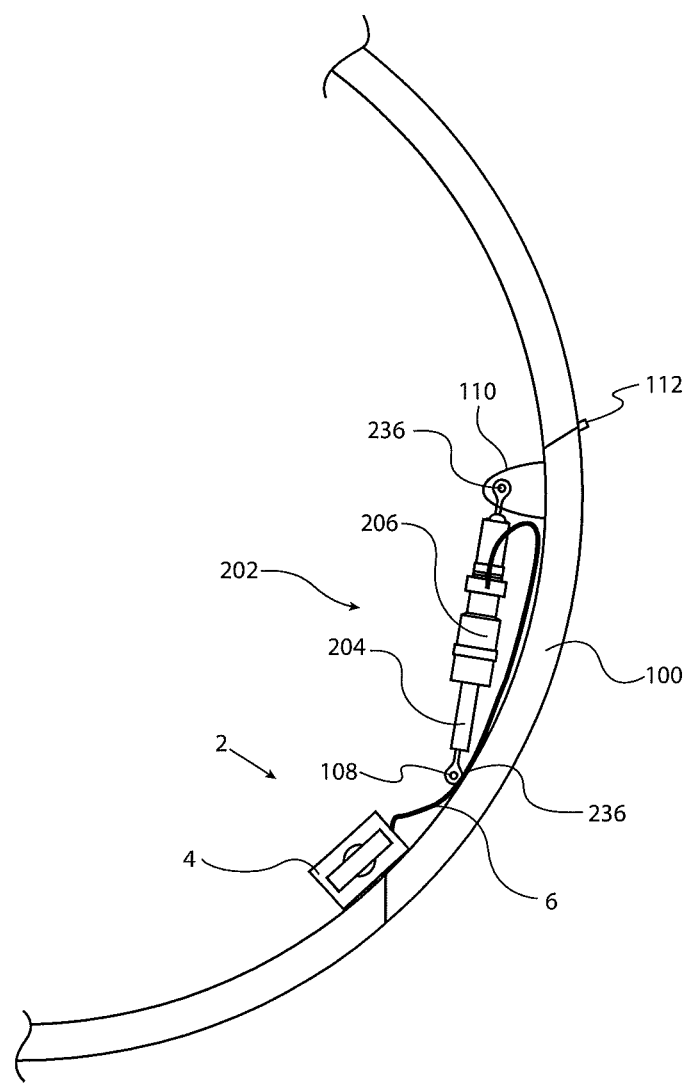
FIG. 1 illustrates a cross sectional view illustrating a cable release system with a hold open rod implemented with a door in a closed configuration according to one aspect of the disclosure.

The disclosure will now be described with reference to the drawing figures, in which like reference numerals refer to like parts throughout, Various aspects of the disclosure advantageously provide a cable release system for a hold open rod mechanism. Various aspects of the disclosure advantageously also provide a cable release system for a latch mechanism. However, for brevity of disclosure, the implementation of the cable release system utilized in a hold open rod will be discussed in detail. However, it is contemplated that the disclosed cable release system may likewise be utilized to remotely operate a latch mechanism or similar component or structure.

FIG. 1 illustrates a cross-sectional view illustrating a cable release system with a hold open rod implemented with a door in a closed configuration according to one aspect of the disclosure.

In particular, FIG. 1 is a cross-sectional view illustrating a door 100, hatch, etc. in a closed configuration suitable for use with a hold open rod 202 according to an aspect of the disclosure. The door 100 may be located in a vehicle such as an aircraft, a bus, a ship, a train, or the like. Moreover, the door 100 may be located in a house, a building, or other structure. As illustrated in FIG. 1, the door 100 may be located in a fuselage of an aircraft. In other aspects, the door 100 may be an access panel, a radome door, a cover, a cowling, etc, for an engine nacelle, a luggage compartment, or other compartment in an aircraft, vehicle, etc. In addition, the hold open rod 202 may be used in other structures such as buildings for a door, a hatch, an access panel, a cover, a cowling, a window, and the like. In this regard, for brevity of disclosure, each of these various structures will be referred to in a non-limiting way as the door throughout the disclosure. In particular aspects, due to the advantageous reduction in weight and ease of maintenance, the hold open rod 202 may be particularly useful in aircraft and other types of vehicles. The hold open rod 202 may be made from various metallic materials such as aluminum, steel, titanium, and the like. Moreover, the hold open rod 202 may be formed of nonmetallic materials such as Kevlar, carbon fiber, fiberglass, various resins, a plastic, a synthetic material, a polyimide material, including aliphatic polyamides, polyphthalamides, aromatic polyamides, another type of thermoplastic compound, and the like. Implementation using nonmetallic materials may be preferable in some areas such as a radome to avoid interference with transmission and reception.

The hold open rod 202 may include an inner tube 204 and an outer tube 206. The inner tube 204 and outer tube 206 may be in axial alignment and slidable relative to one another in a telescoping manner. The inner tube 204 of the hold open rod 202 may be attached to the door 100 with a rod end 236 that pivotally connects to a door fitting 108. The hold open rod 202 may be attached to the fuselage, engine nacelle, etc. by a bracket 110 that is connected to a rod end 236 of the outer tube 206. A converse attachment orientation is also contemplated by the disclosure. Moreover, other types of attachments are contemplated as well.

FIG. 1 further illustrates the cable release system 2. The cable release system 2 may be configured to actuate an unlocking mechanism associated with the hold open rod 202. In prior art implementations, personnel needed to directly interact with the hold open rod 202 and, in particular, the unlocking mechanism associated with the hold open rod 202 in order to unlock the hold open rod 202. The cable release system 2 may be configured to operate the unlocking mechanism of the hold open rod 202 without the need to directly interact with the unlocking mechanism of the hold open rod 202. The cable release system 2 may include an actuator 4 and a cable 6.

The actuator 4 may be located externally to a vehicle (not shown) or may be located internally to a vehicle as illustrated in FIG. 1. Moreover, the actuator 4 may be located vertically lower than the hold open rod 202 in order to make it more easily accessible by personnel. In particular, the actuator 4 may be positioned such that personnel standing on ground level may grasp the actuator 4 for operation thereof. As illustrated in the FIG. 1, the actuator 4 is located vertically below the hold open rod 202.

The cable release system may further include the cable 6 that may extend from the actuator 4 to the hold open rod 202. Moreover, the cable 6 may extend from the actuator 4 to the unlocking mechanism of the hold open rod 202. The cable 6 may be configured to travel a short distance. In this regard, the cable 6 may connect, interact with, and/or move the unlocking mechanism from a non-unlocking (locked) position to an unlocking position. In other words, movement of the cable 6 actuates the unlocking mechanism.

In one aspect, the cable 6 may be implemented as a Bowden cable that may include a flexible cable to transmit mechanical force or energy by a movement of an inner cable relative to a hollow outer cable housing. The housing may include a composite construction with an inner lining, a longitudinally incompressible layer such as a helical winding or a sheaf of steel wire, and a protective outer covering. The linear movement of the inner cable may transmit a push/pull force to the unlocking mechanism of the hold open rod 202. Moreover, the cable 6 may include one or more components configured for adjusting the cable tension using an inline hollow bolt, a barrel adjuster, or the like. The components may be configured such that they lengthen or shorten the cable housing relative to a fixed anchor point. In one aspect, lengthening the housing tightens the cable; and shortening the housing loosens the cable.

The cable release system 2 may be configured such that movement of the actuator 4 by personnel will move the cable 6 and subsequently move the unlocking mechanism of the hold open rod 202 to an unlocking position. In other words, operating the actuator 4 unlocks the hold open rod 202.

Figure 2:
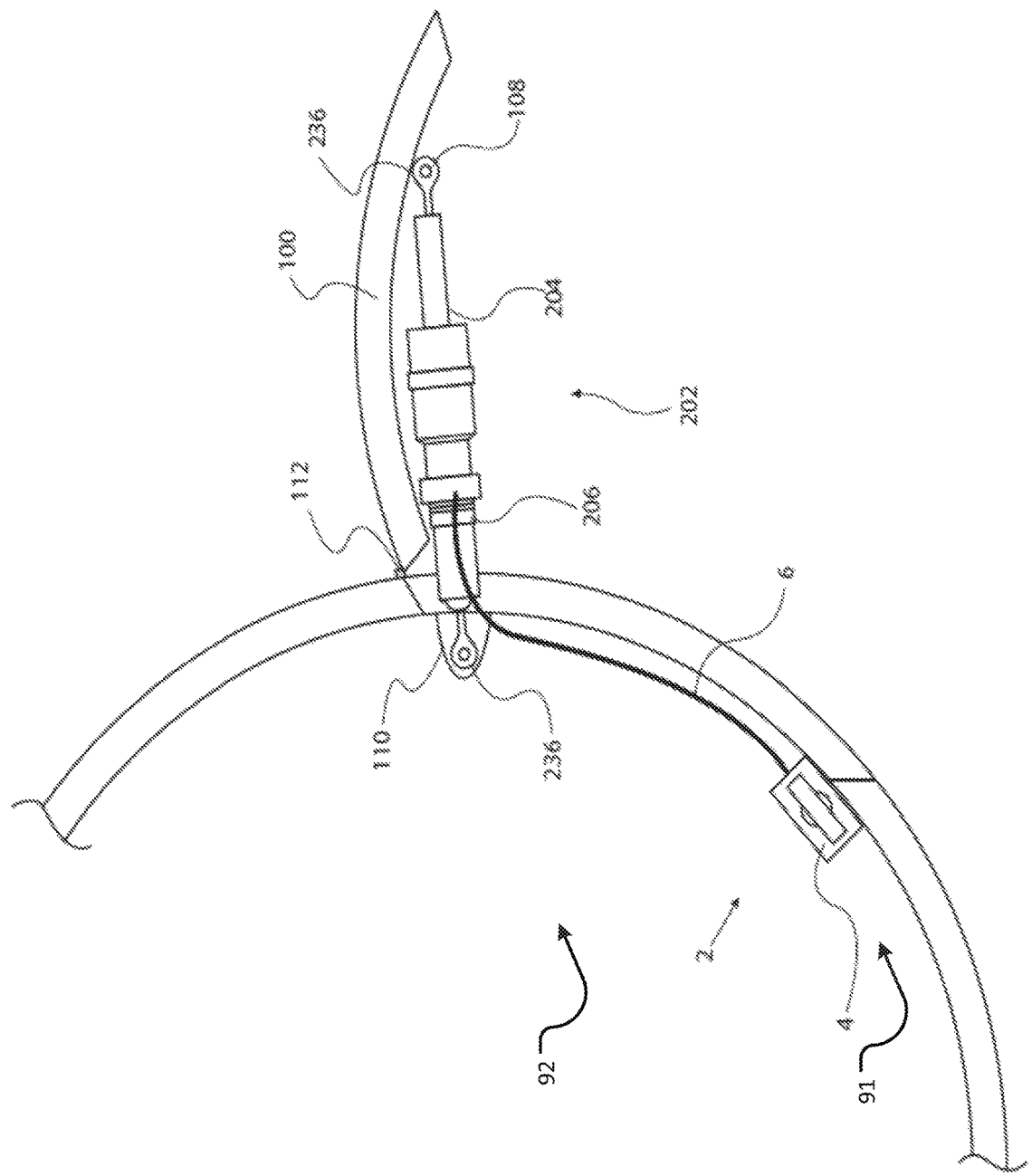
FIG. 2 illustrates a cross sectional view illustrating a cable release system with a hold open rod implemented with a door n an open configuration according to one aspect of the disclosure.

FIG. 2 illustrates a cross-sectional view illustrating a cable release system with a hold open rod implemented with a door in an open configuration according to one aspect of the disclosure.

As shown in FIG. 2, the door 100 may swing open and upwards via a hinge 112. Other door movements are contemplated as well. In response to the door 100 being opened, the inner tube 204 may telescope out from the outer tube 206. In the aspect illustrated in FIG. 2, the door 100 is configured to close at least by gravity acting on the door 100. The hold open rod 202 maintains the door 100 in an open position with a lock providing resistance on the inner tube 204 to prevent the inner tube 204 from sliding into the outer tube 206, FIG. 2 further illustrates that the elevated position 92 of the door 100 likewise elevates the position of the hold open rod 202. The unlocking mechanism of the hold open rod 202 is likewise elevated. Accordingly, the operation of the unlocking mechanism may be more difficult for personnel to operate and/or reach easily without the disclosed cable release system 2, On the other hand, as further illustrated in FIG. 2, the cable release system 2 and, in particular, the actuator 4 may be vertically located lower than the hold open rod 202 at a lower position 91. Accordingly, personnel can more easily operate the actuator 4, that moves the cable 6, and subsequently moves the unlocking mechanism such that the hold open rod 202 may be unlocked to allow the door 100 to move back to a closed position (as illustrated in FIG. 1), FIG. 3 illustrates a partial front perspective view illustrating a cable release mechanism according to one aspect of the disclosure.

Figure 3:
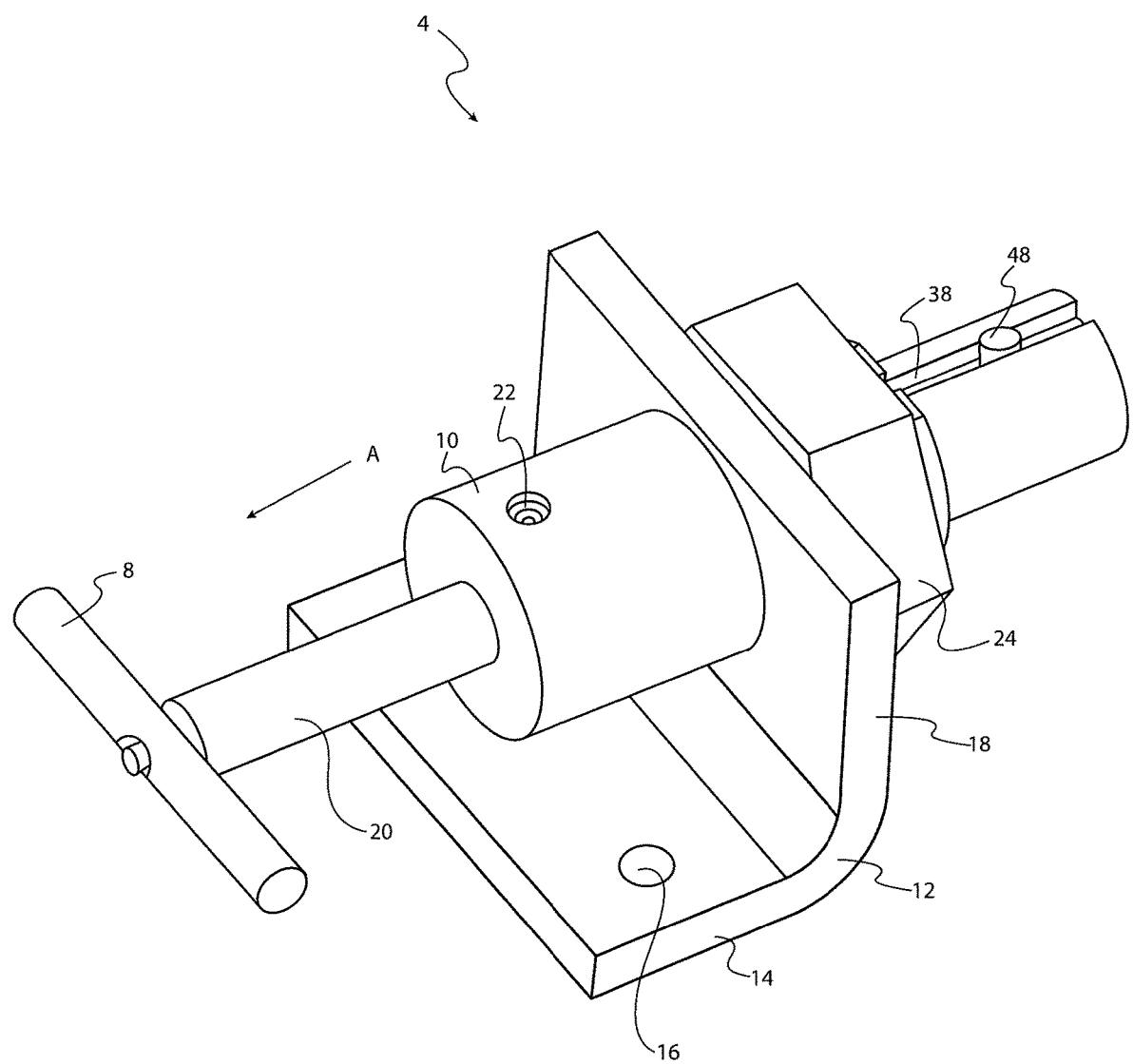
FIG. 3 illustrates a partial front perspective view illustrating a cable release mechanism according to one aspect of the disclosure.
Figure 4:
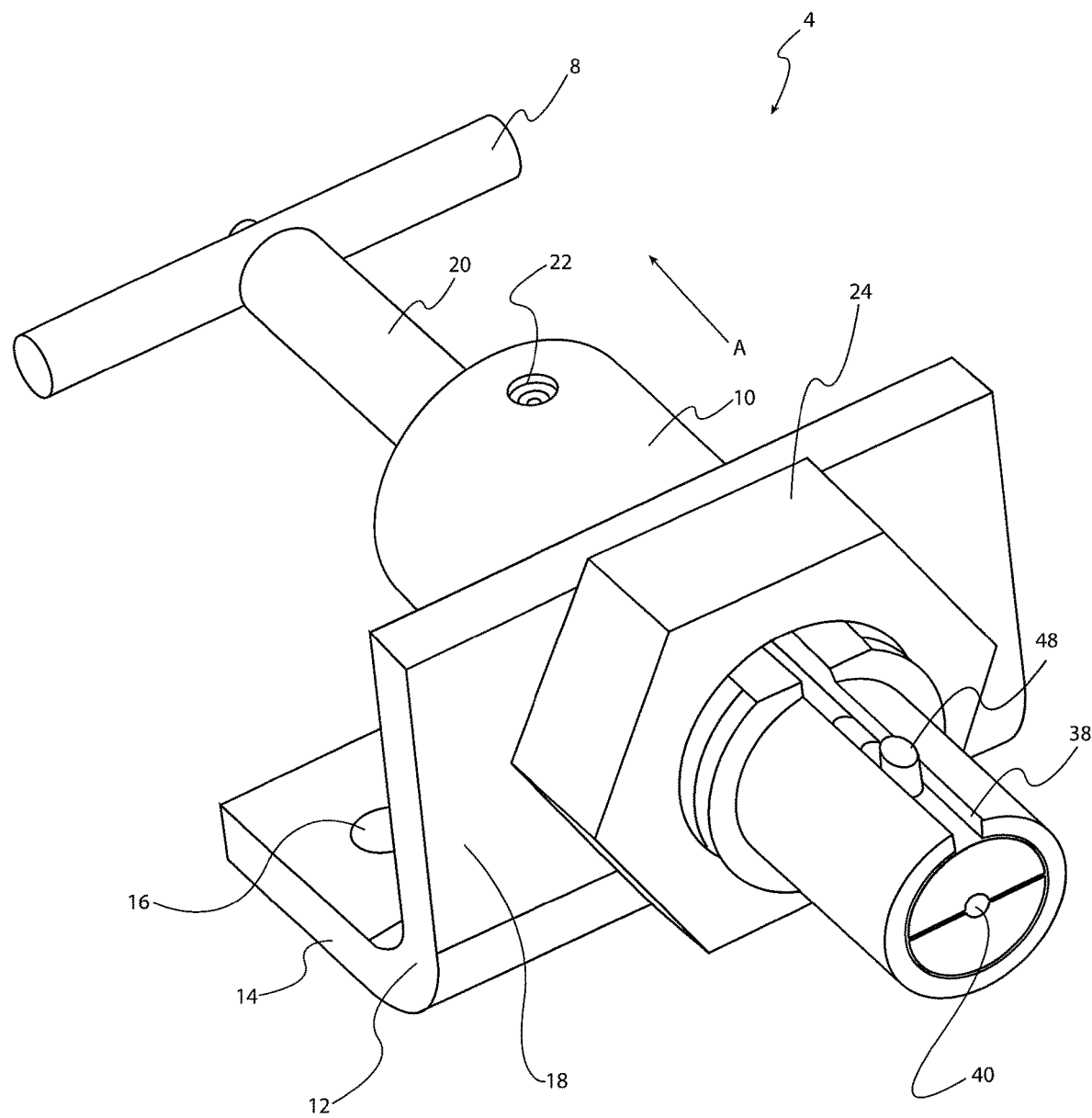
FIG. 4 illustrates a partial back perspective view of the cable release mechanism according to FIG. 3.

FIG. 4 illustrates a partial back perspective of the cable release mechanism according to FIG. 3.

Figure 5:
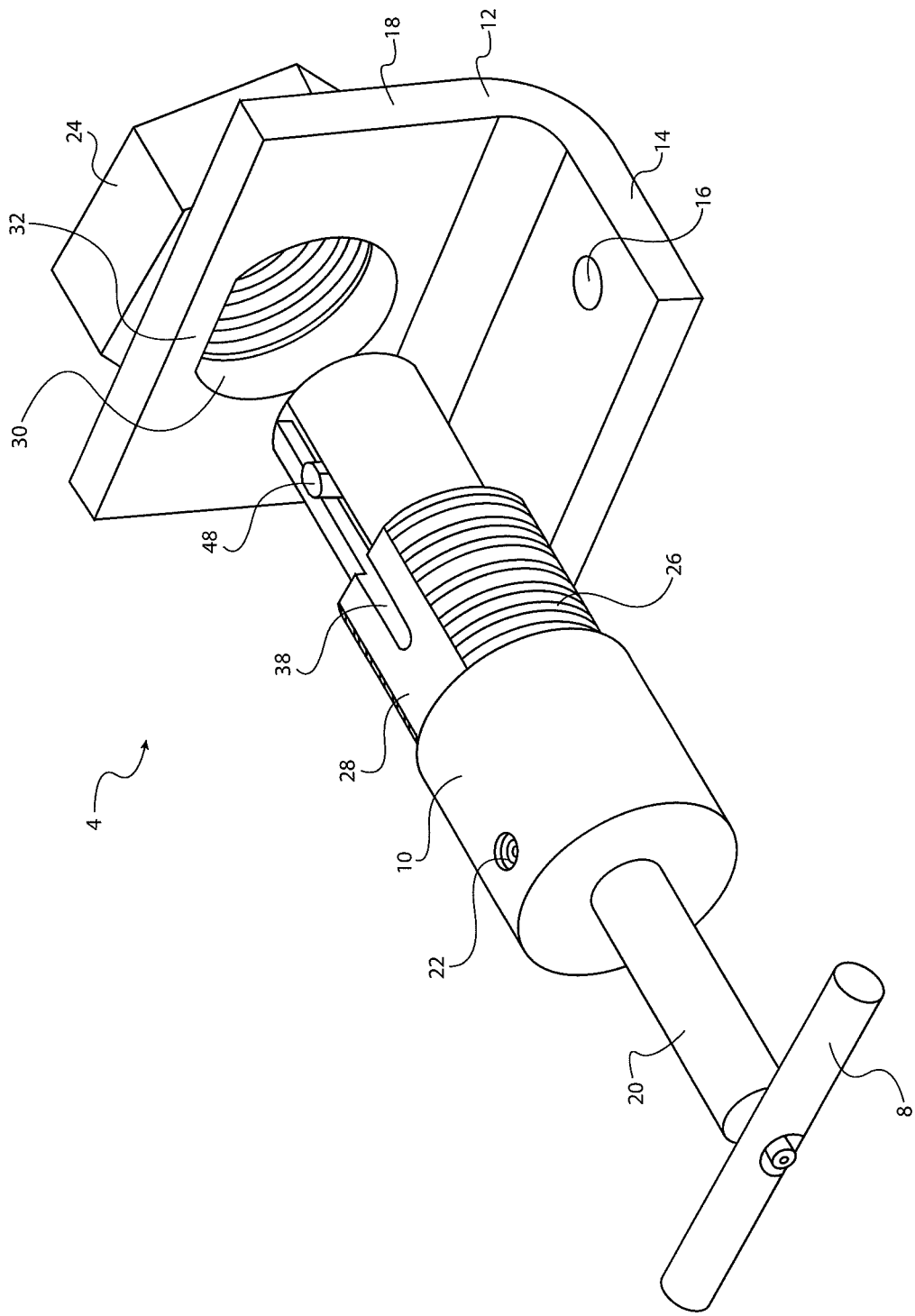
FIG. 5 illustrates a partial exploded front perspective view of the cable release mechanism according to FIG. 3.

FIG. 5 illustrates a partial exploded front perspective view of the cable release mechanism according to FIG. 3.

In particular, as illustrated in FIG. 3 the actuator 4 may include a bracket 12. The bracket 12 may be configured to mount the actuator 4 to a support structure such as an internal component of the vehicle, external component of a vehicle, a hard point, a frame, or the like. In other aspects, the actuator 4 may not include a bracket 12 and may otherwise be mounted to a support structure. In yet other aspects, the actuator 4 may not be mounted to a support structure and may be freely suspended.

In some aspects, the bracket 12 may include a mounting portion 14. The mounting portion 14 may be configured with mounting apertures 16 configured to receive a mechanical fastener to fasten the bracket 12 to the support structure. In some aspects, the bracket 12 may further include a support portion 18. The support portion 18 may be configured to support the remaining components of the actuator 4. In one aspect, the bracket 12 may be configured with an L-shaped cross-section with a vertical portion of the L-shaped cross-section being the support portion 18 and the lower horizontal portion of the L-shaped cross-section being the mounting portion 14.

The actuator 4 may further include a handle 8. The handle 8 may be configured ergonomically to be grasped by personnel and moved in the direction of arrow A. Movement of the handle 8 in the direction of arrow A likewise moves an actuation shaft 20 in the direction of arrow A. The actuation shaft 20 may be directly or indirectly connected to the handle 8. The actuation shaft 20 may be directly or indirectly connected to the cable 6 and accordingly movement of the actuation shaft 20 may likewise move the cable 6 in the direction of arrow A to activate the unlocking mechanism of the hold open rod 202.

The activation shaft 20 may extend into an out of a body 10 that is secured to the bracket 12. As illustrated in FIG. 5, the body 10 may include a first large diameter portion and a smaller diameter portion. The smaller diameter portion may include a threaded portion 26. The threaded portion 26 may extend through an aperture 30 in the bracket 12. In particular, the aperture 30 may be located in the support portion 18. The actuator 4 may further include a jam nut 24 having a threaded internal portion that engages the threaded portion 26 of the body 10. In other words, a male portion of the threaded portion 26 engages a female threaded portion of the jam nut 24 with the bracket 12 therebetween to provide sturdy support for the actuator 4.

In some aspects, the threaded portion 26 of the body 10 may include a flat portion 28. The flat portion 28 may engage a corresponding flat surface 32 within the aperture 30. Accordingly, in this aspect the flat portion 28 and the flat surface 32 may prevent rotational movement of the body 10. In one aspect, the aperture 30 may have a "D" shaped cross-section. Of course, it should be appreciated that other configurations to hold the body 10 in a stable, non-rotating, and/or supported configuration are contemplated as well.

The body 10 may further include an aperture for receiving a set screw 22 or other structure. In one aspect, a purpose of the set screw 22 is to limit the movement of the actuation shaft 20. In this regard, the aperture in the body 10 may include female threads and the set screw 22 may include male threads for engagement therewith. Other configurations for limiting the movement of the actuation shaft 20 are contemplated as well.

FIG. 4 further illustrates the cable attachment 40 illustrated without the cable 6 installed. As previously mentioned, movement of the handle 8 and the actuation shaft 20 moves the cable 6. As further illustrated in FIG. 4, movement of the handle 8 and actuation shaft 20 moves the cable attachment 40 as well in the direction of arrow A as illustrated.

Figure 6:
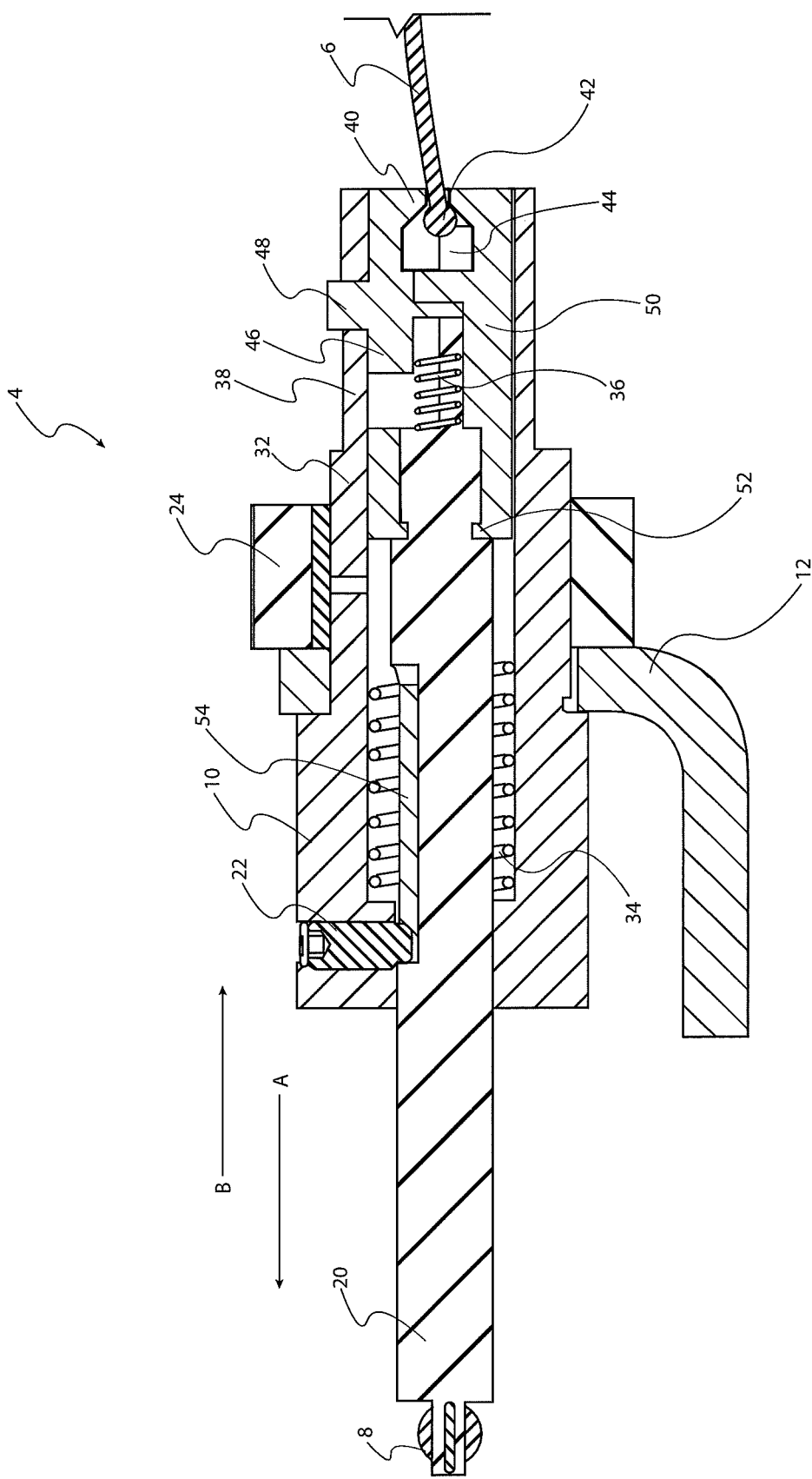
FIG. 6 illustrates a cross-sectional view of the cable release mechanism according to FIG. 3.

FIG. 6 illustrates a cross-sectional view of the cable release mechanism according to FIG. 3.

Figure 7:
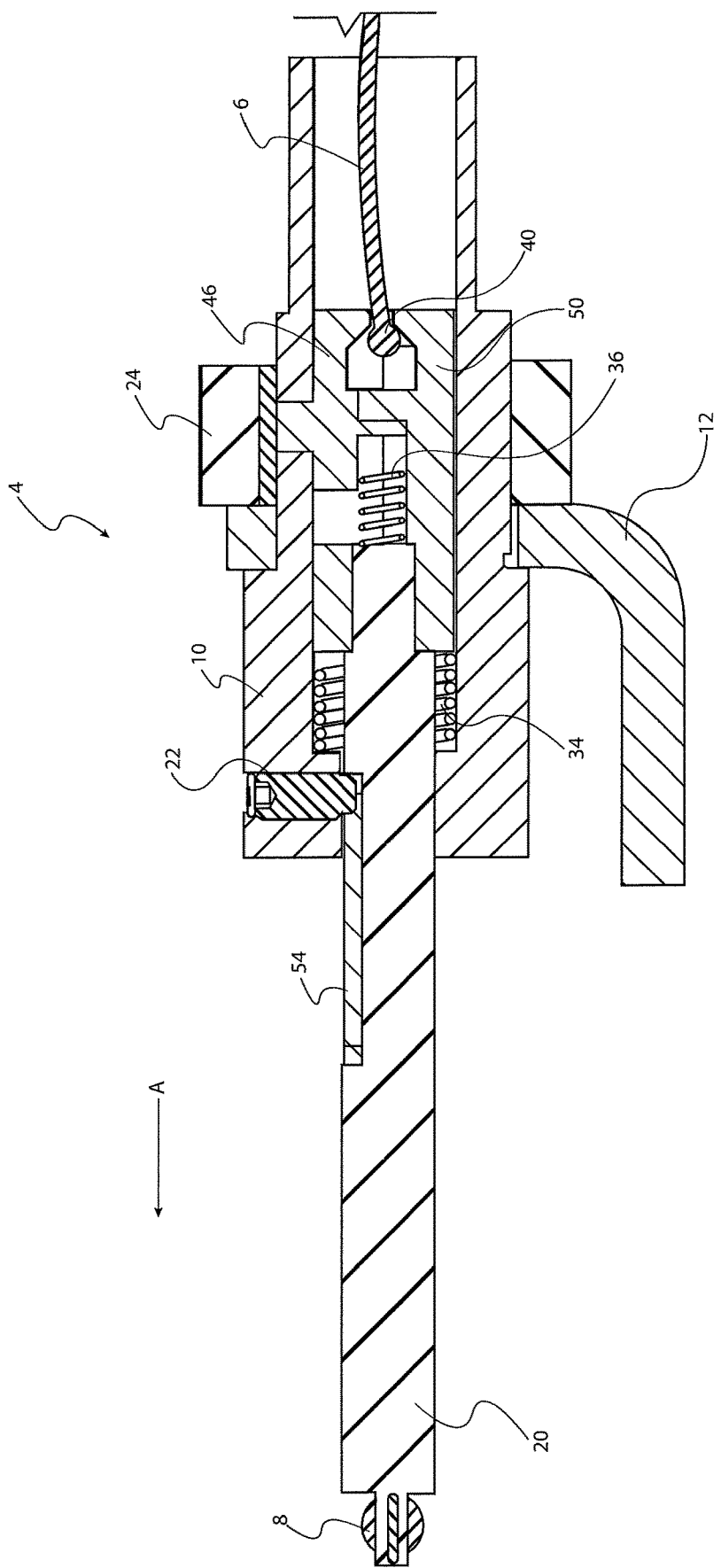
FIG. 7 illustrates a cross-sectional view of the cable release mechanism in the actuated position according to FIG. 3.

FIG. 7 illustrates a cross-sectional view of the cable release mechanism in the actuated position according to FIG. 3.

In particular, FIG. 6 illustrates that the actuation shaft 20 may include a slot 54 that is configured to receive a portion of the set screw 22. The slot 54 extends a limited length along the actuation shaft 20 and together with the set screw 22 defines the operational limits of movement of the actuation shaft 20, handle 8, and the cable 6. As shown in FIG. 6, the handle 8 and actuation shaft 20 are in their right most position such that the set screw 22 engages a leftmost portion of the slot 54.

In contrast, as shown in FIG. 7, the handle 8 and the actuation shaft 20 are in their left most position such that the set screw 22 engages a right most portion of the slot 54. In this regard, FIG. 7 illustrates the configuration of the actuator 4 when personnel have moved the handle 8 and the actuation shaft 20 in the direction of arrow A. In this position, the cable 6 has likewise moved in the direction of arrow A to operate the unlocking mechanism associated with the hold open rod 202.

The actuator 4 may further include a spring 34 arranged and configured to urge the handle 8, the actuation shaft 20, and the cable 6 rightwardly in the direction of arrow B. Operation of the actuator 4 by personnel by pulling the handle 8 in the direction of arrow A may compress the spring 34 as illustrated in FIG. 7 and once the handle 8 is released the spring 34 will return the handle 8, the actuation shaft 20, and the cable 6 back in the direction of arrow B back to the non-unlocking position as illustrated in FIG. 6.

As further illustrated in FIG. 6, the actuation shaft 20 may be connected to the cable attachment 40. The cable attachment 40 may be configured to connect and hold the cable 6. The cable attachment 40 may be configured with a lower slide 50 and a release slide 46. As illustrated in FIG. 6, the combination of the lower slide 50 and release slide 46 form an aperture having a diameter commensurate with the diameter of the cable 6. The combination of the lower slide 50 and release slide 46 may also define the cable attachment 40 as well as a cable chamber 44. The cable chamber 44 may be configured to securely hold a cable ball end 42 in order to securely attach the cable 6 to the cable attachment 40. Moreover, the cable attachment 40 may move the cable 6 in the direction of arrow A in correspondence with movement of the handle 8. The lower slide 50 may be connected to the actuation shaft 20 in any manner. In one aspect, the lower slide 50 may include engagement portions 52 that engage a slot in the actuation shaft 20. However, the lower slide 50 may be connected to the actuation shaft 20 with mechanical fasteners, welded, connected by adhesive, or the like. Moreover, the lower slide 50 may also be integral with the actuation shaft 20. Other implementations are contemplated as well.

The release slide 46 may be supported on top of the lower slide 50 and engage with the lower slide 50 in any known manner. In one aspect, the release slide 46 may include an extension (such as extension 70 illustrated in FIG. 9) that extends into a slot of the lower slide 50 such that movement in the direction of arrow A by the lower slide 50 likewise moves the release slide 46 in the direction of arrow A. The slot in the lower slide 50 may include a spring 36 that engages a surface of the actuation shaft 20 and a surface of the release slide 46 to urge the release slide 46 in the direction of arrow B to maintain the position of the release slide 46 relative to the lower slide 50 to ensure that the cable attachment 40 securely holds the cable ball end 42.

On the other hand, the release slide 46 may move separately from the lower slide 50 and compress the spring 36 when moved in the direction of arrow A to release the cable ball end 42 from the cable chamber 44 as described in further detail below. Movement of the release slide 46 relative to the lower slide 50 may be accomplished by applying a force to the extension 48 on the upper side of the release slide 46 in the direction of arrow A while the handle 8 and the actuation shaft 20 remain stationary for example.

In this regard, the extension 48 may extend through a slot 38 arranged in the body 10. The slot 38 allowing movement of the extension 48 as well as the release slide 46 in the direction of arrow A and in the direction of arrow B. Additionally, the slot 38 may otherwise prevent movement of the extension 48 in directions other than in the direction of arrow A and in the direction of arrow B.

Figure 8:
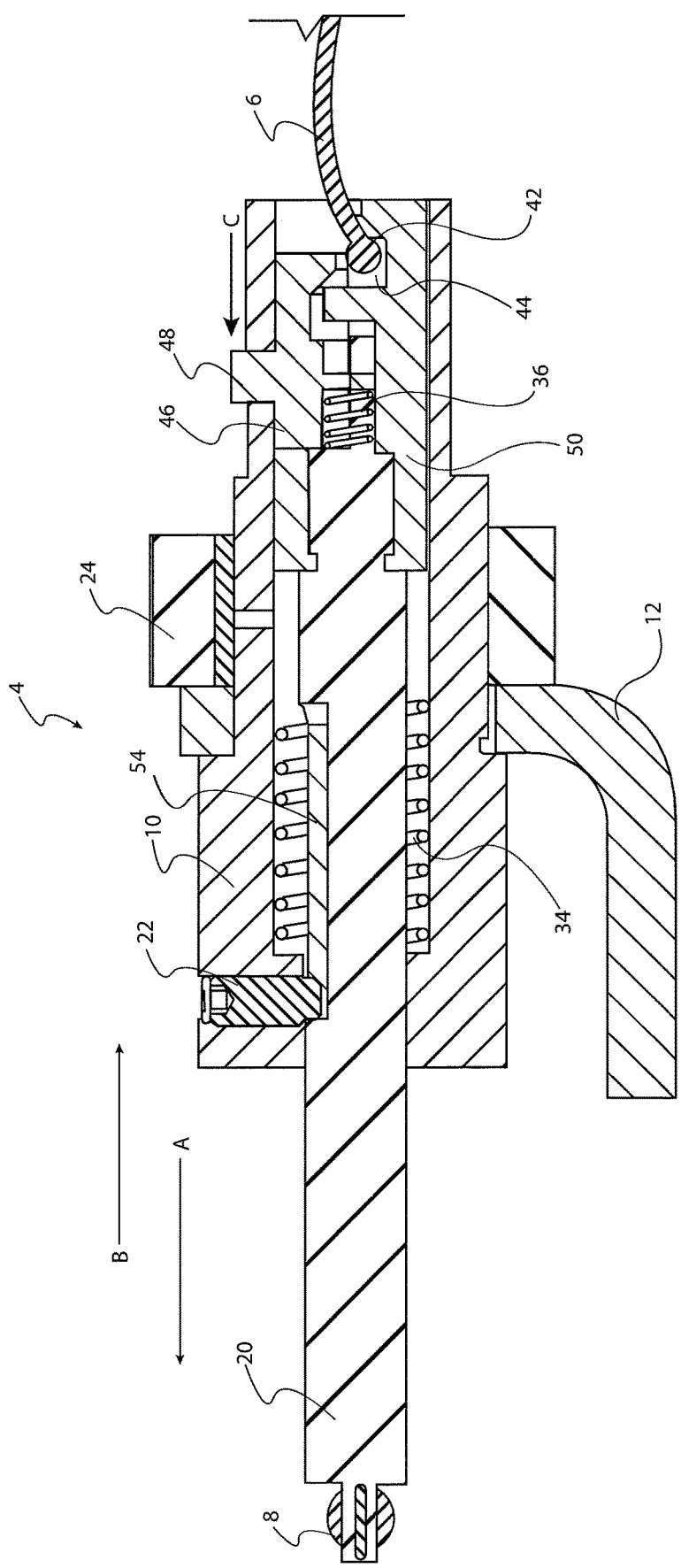
FIG. 8 illustrates a cross-sectional view of the cable release mechanism in the cable release configuration according to FIG. 3.

FIG. 8 illustrates a cross-sectional view of the cable release mechanism in the cable release configuration according to FIG. 3.

Figure 9:
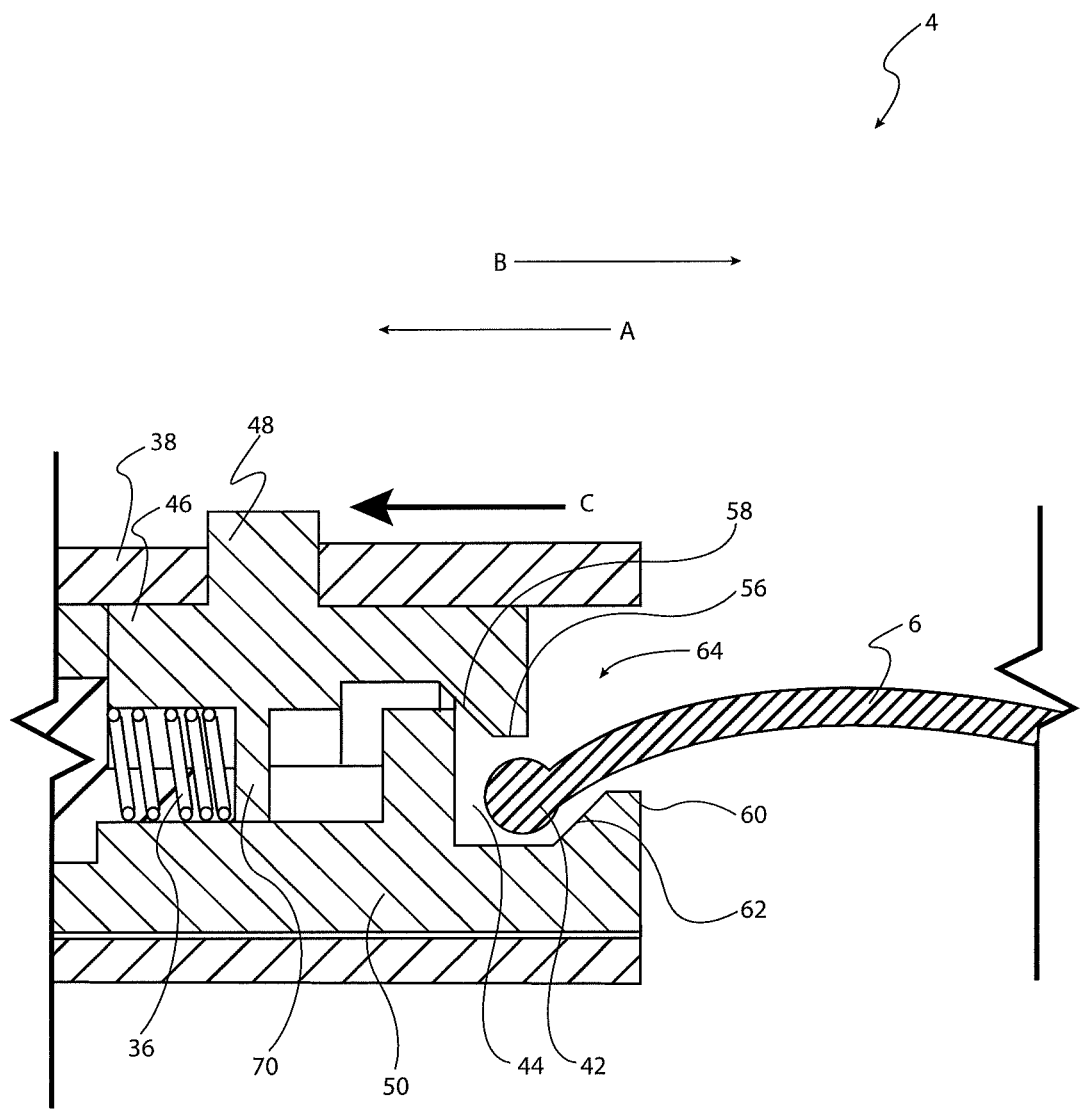
FIG. 9 illustrates a partial cross-sectional view of the cable release mechanism in the cable release configuration according to FIG. 3.

FIG. 9 illustrates a partial cross-sectional view of the cable release mechanism in the cable release configuration according to FIG. 3.

Figure 10:
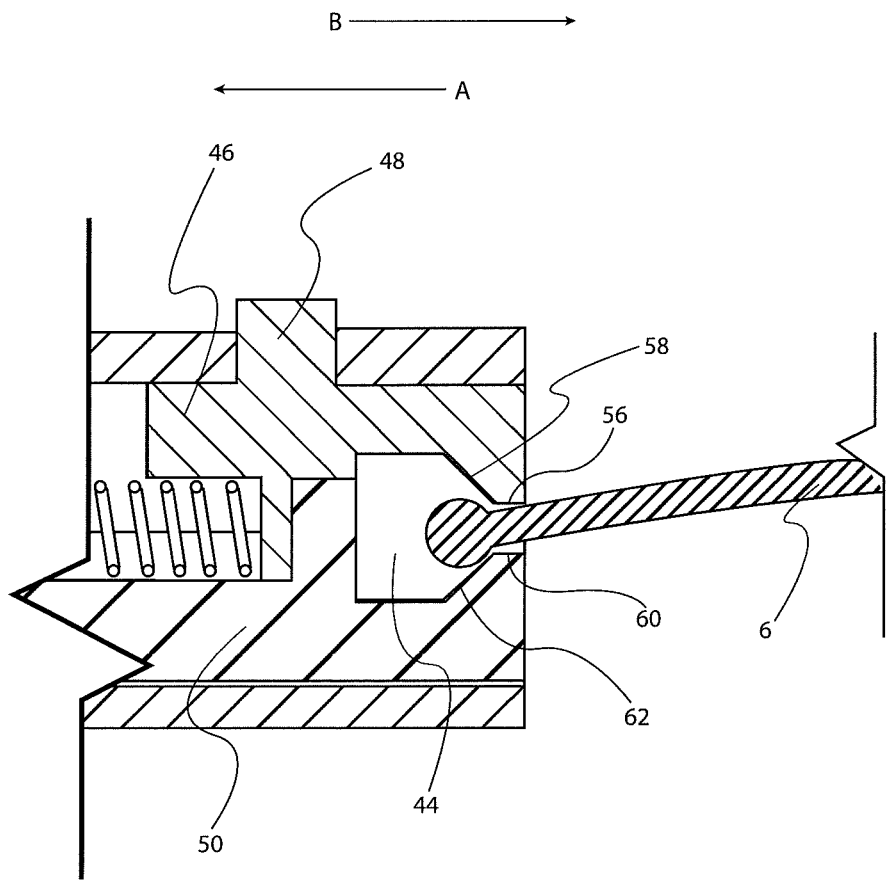
FIG. 10 illustrates a cross-sectional view of the cable release mechanism in the cable locked configuration according to FIG. 3.

FIG. 10 illustrates a cross-sectional view of the cable release mechanism in the cable locked configuration according to FIG. 3.

In particular, FIG. 8 illustrates the cable release configuration of the actuator 4. More specifically, during installation, removal, or repair, the cable 6 can be removed or inserted into the actuator 4. In this regard, personnel can move the release slide 46 in the direction of arrow A by applying a force to the extension 48 as shown by arrow C. The force can be applied to the extension 48 by hand, with a tool, or the like. The force applied to the extension 48 moves the release slide 46 in the direction of arrow A relative to the lower slide 50 compressing the spring 36 to create an opening to allow the cable ball end 42 to be removed from the cable chamber 44.

As further illustrated in FIG. 9, the release slide 46 may include a horizontal flat surface 56 and an inclined surface 58. The lower slide 50 may have a corresponding horizontal flat surface 60 and an inclined surface 62. In this regard, movement of the release slide 46 moves the horizontal flat surface 56 and the inclined surface 58 in the direction of the arrow A relative to the lower slide 50 creating an enlarged space 64 that allows the cable ball end 42 to be removed from the cable chamber 44, The force applied to the extension 48 is indicated by arrow C and the force moves the release slide 46 in the direction of arrow A to likewise compress the spring 36 between the extension 70 of the release slide 46 and a portion of the actuation shaft 20. Once the enlarged space 64 is operatively formed, the cable ball end 42 can be inserted or removed from the cable chamber 44.

As illustrated in FIG. 10, when the force is removed from the extension 48, the spring 36 may force the extension 70 in the direction of arrow B to close the cable chamber 44. In this regard, the horizontal flat surface 56 and the horizontal flat surface 60 may thereafter engage the diameter of the cable 6. Moreover, the inclined surface 58 and the inclined surface 62 may engage the cable ball end 42. Movement of the cable 6 in the direction of arrow B may force of the cable ball end 42 to engage the inclined surface 58 and engage the inclined surface 62 to securely hold the cable ball end 42 within the cable chamber 44 and thus provide a secure attachment.

The cable release system 2 may be utilized in any type of hold open rod, latch mechanism, or the like that may benefit from a remote operation. One exemplary hold open rod that may utilize and benefit from the above disclosed cable release system 2 is described below. However, numerous other hold open rod mechanisms and latch mechanisms are contemplated as well.

Figure 11:
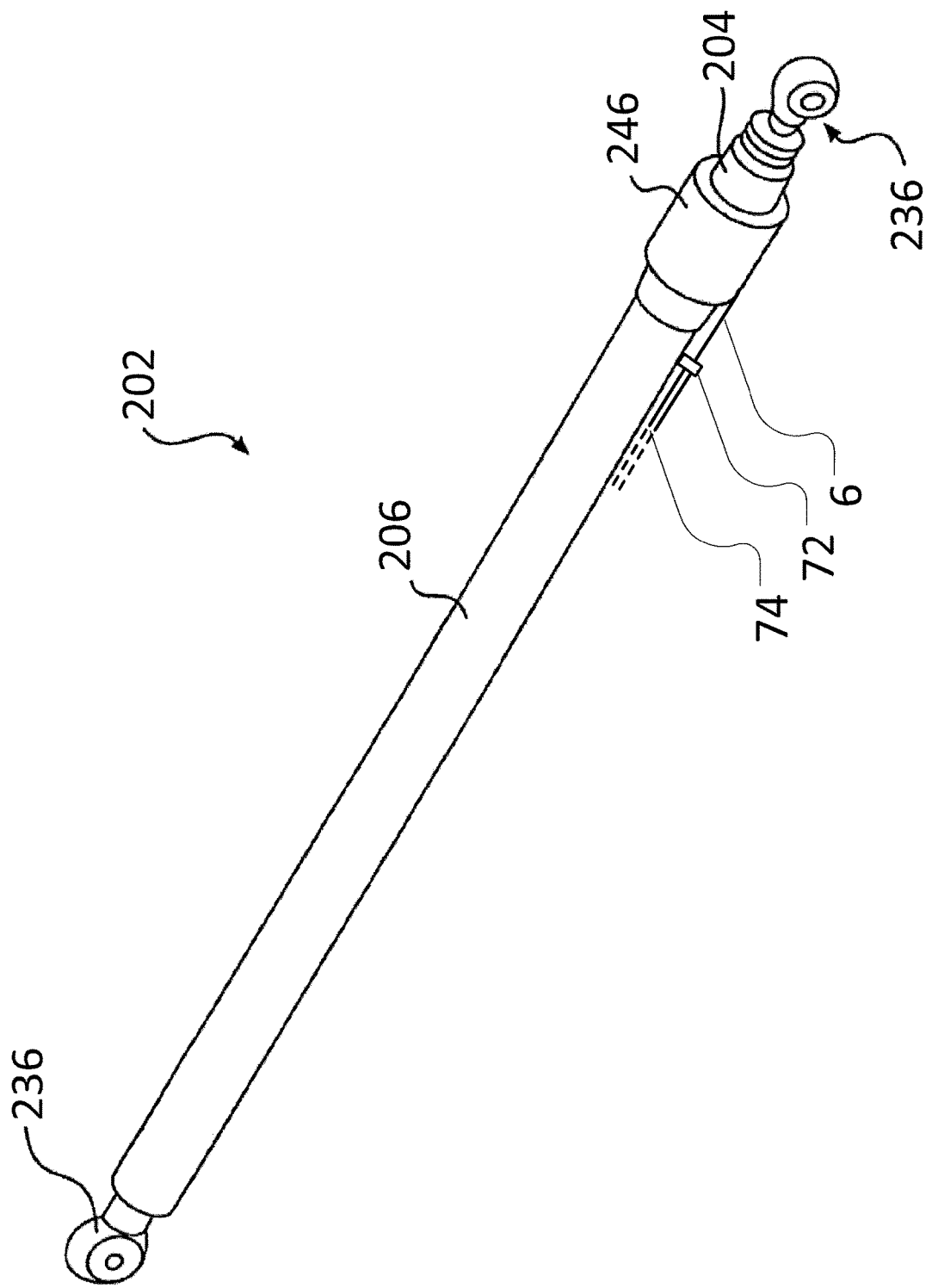
FIG. 11 is a perspective view of a hold open rod in accordance with an aspect of the disclosure.

FIG. 11 is a perspective view of a hold open rod in accordance with an aspect of the disclosure.

In particular, FIG. 11 illustrates the hold open rod 202 having an outer collar assembly 246. The outer collar assembly 246 may be implemented as the unlocking mechanism. As further illustrated in FIG. 11, the cable 6 may be engaged with the outer collar assembly 246 and movement of the cable 6 may move the outer collar assembly 246 and place the outer collar assembly 246 in the unlocked position or the non-unlocked position. The cable 6 may be supported by a support 72 that engages a cable housing 74.

The hold open rod 202 may include an inner tube 204 that slides within an outer tube 206. The position of the hold open rod 202 shown in FIG. 11 is the stowed, also referred to as the rest, or retracted position. In this position, the inner tube 204 is substantially inside the outer tube 206.

The hold open rod 202 may be extended by sliding the inner tube 204 far enough out from the outer tube 206 to reach a desired length. The hold open rod 202 may include rod ends 236 to connect the hold open rod 202 to an object to which it will be mounted. For example, rod ends 236 may attach to a door or hatch on one side and on the other side to a frame of the door or hatch, thereby allowing the hold open rod 202 to hold the door or hatch in an open position. The hold open rod 202 can be allowed to selectively lock the inner tube 204 to the outer tube 206 in order to, for example, hold a door, or hatch in an open position. The unlocking of the hold open rod 202 may be accomplished by manipulation of an outer collar assembly 246 by the cable 6 and the actuator 4.

When a hold open rod 202 is in a stowed position, as shown in FIG. 11, the door or hatch may likewise be in a closed position. Often, the stowed position is the position in which the hold open rod 202 spends a majority of its time.

Figure 12:
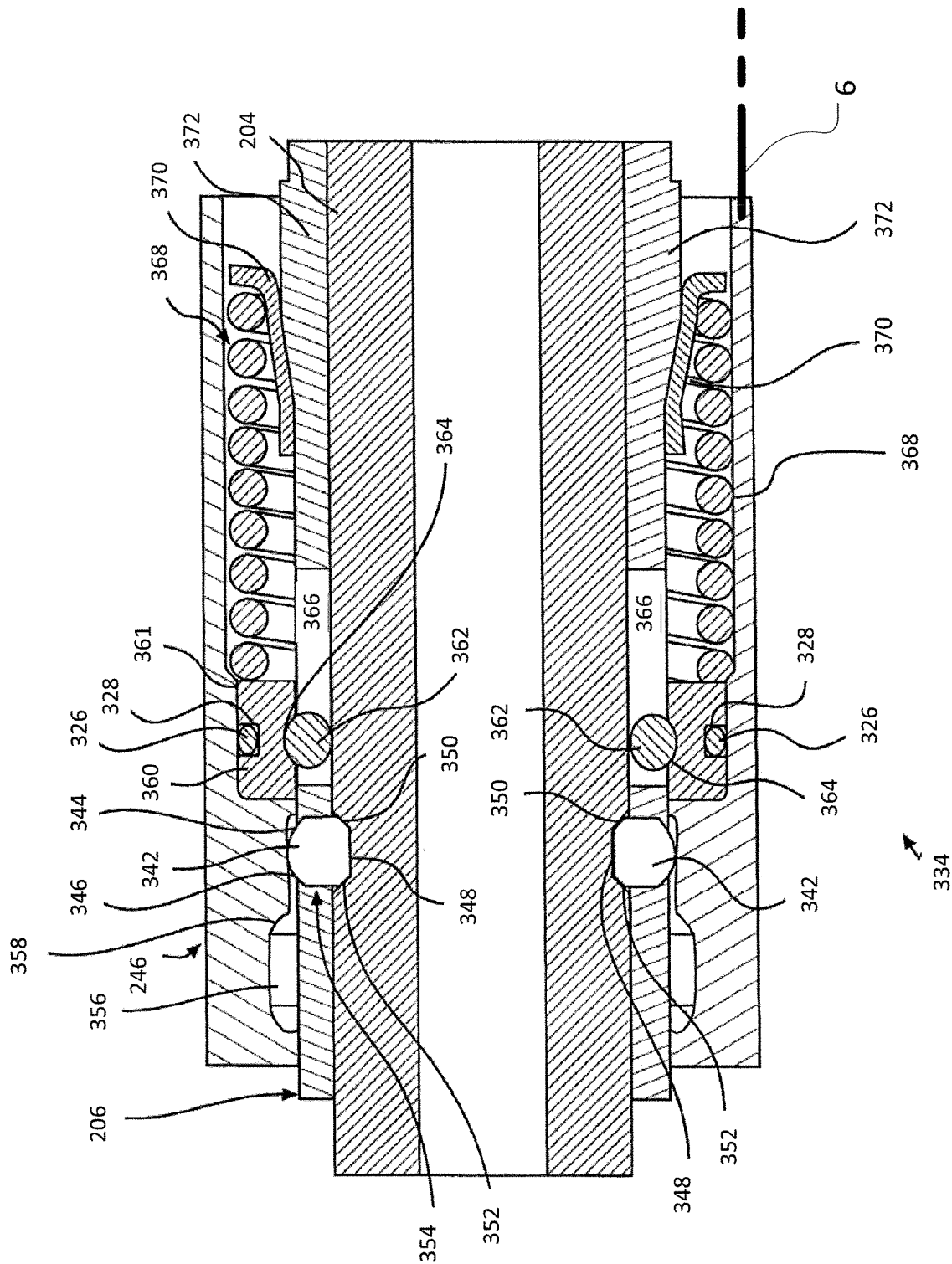
FIG. 12 is a cross-sectional view of a portion of the hold open rod in accordance with an aspect of the disclosure.

FIG. 12 is a cross-sectional view of a portion of the hold open rod in accordance with an aspect of the disclosure.

FIG. 12 illustrates an exemplary implementation of a lock mechanism 334, which locks the inner tube 204 with the outer tube 206. While the lock mechanism 334 is described in some detail, it will be understood by one of ordinary skill in the art that various aspects of the disclosure can use various implementations of the lock mechanism 334. The lock mechanism 334 shown is meant to be an exemplary lock mechanism and should not limit the disclosure in anyway. Furthermore, it should be noted that in some aspects the lock mechanism 334 is not an essential part of the disclosure but is merely an incidental feature of hold open rod 202.

As shown in FIG. 12, the hold open rod 202 includes an outer tube 206. The outer tube 206 may be swaged. Other aspects may include a lock body, which is threaded into the outer tube 206 for performing the locking function. On the outer diameter of the swaged portion of the outer tube 206 on the locking mechanism 334, there may be a spring-loaded outer collar assembly 246. The outer collar assembly 246 may house locking dogs 342 and retains the locking dogs 342 radially against the outside diameter of the inner tube 204 while the hold open rod 202 is in the retracted or stowed position.

The locking dog 342 may include chamfered edges 344 and chamfered edges 346. A locking slot 348 may also include chamfered edges 350 and chamfered edges 352. The chamfered edges 344, chamfered edges 346, chamfered edges 350, and chamfered edges 352 aid in assisting the locking dog 342 moving in and out of the locking slot 348.

As shown in FIG. 12, the outer collar assembly 246 is in a position that prevents the locking dog 342 from exiting the locking slot 348. Thus, the inner tube 204 and outer tube 206 are locked together. However, if the release collar assembly 246 is moved toward the right with respect to the orientation shown in FIG. 12 by the cable 6 and the actuator 4, the opening 356 in the outer collar assembly 246 will be exposed to the locking dog 342 allowing the locking dog 342 to move out radially and into the opening 356, Such a move by the locking dog 342 will unlock the inner tube 204 from the outer tube 206.

Movement of the outer collar assembly 246 to the right will cause an isolator 360 contacting the outer collar assembly 246 along a surface 361 to move on the roller or ball bearing 362 located in the ball bearing slot 364 in the isolator 360. The isolator 360 and ball bearing 362 may move within a slot 366 in the outer tube 206 against the urging of a spring 368. The spring 368 may be arranged between the isolator 360 and a spring stop 370 and may exert a force on both. The spring stop 370 may be placed against a thicker part 372 of the outer tube 206. The user may overcome the force of the spring 368 by manually moving the outer collar assembly 246 by operating the actuator 4 to move the cable 6 towards the right, thereby unlocking the hold open rod 202 by exposing the opening 356 in the outer collar assembly 246 to the locking dogs 342. Exposing the opening 356 may allow the locking dogs 342 to move radially within an opening 354 in the outer tube 206 and out of the locking slot 348 and into the opening 356, Furthermore, movement of the outer collar assembly 246 back toward the left causes the locking dog 342 to slide its chamfered edge 344 along the chamfered side 358 of the opening 356 causing the locking dog 342 to move back into the locking slot 348, The isolator 360 may include an O-ring groove 328, which contains an O-ring 326.

The hold open rod 202 and/or the lock mechanism 334 may be implemented a number of different ways. In one aspect, the hold open rod 202 and/or the lock mechanism 334 may be implemented consistent with U.S. patent application Ser. No. 14/663,227, filed Mar. 19, 2015 (title—"Pull Then Lift Lock Mechanism") owned by the assignee of the disclosure and incorporated by reference herein in its entirety.

The hold open rod 202 and/or the lock mechanism 334 may be implemented a number of different ways. In one aspect, the hold open rod 202 and/or the lock mechanism 334 may be implemented consistent with U.S. patent application Ser. No. 12/857,947, filed Aug. 17, 2010 (title—"Mechanically Dampening Hold Open Rod") owned by the assignee of the disclosure and incorporated by reference herein in its entirety.

The hold open rod 202 and/or the lock mechanism 334 may be implemented a number of different ways. In one aspect, the hold open rod 202 and/or the lock mechanism 334 may be implemented consistent with U.S. patent application Ser. No. 13/323,355, filed Dec. 12, 2011 (title—"Carbon Fiber Hold Open Rod") owned by the assignee of the disclosure and incorporated by reference herein in its entirety.

The hold open rod 202 and/or the lock mechanism 334 may be implemented a number of different ways. In one aspect, the hold open rod 202 and/or the lock mechanism 334 may be implemented consistent with U.S. patent application Ser. No. 13/314,982, filed Dec. 8, 2011 (title—"Reinforced Plastic Locking Dogs") owned by the assignee of the disclosure and incorporated by reference herein in its entirety.

The hold open rod 202 and/or the lock mechanism 334 may be implemented a number of different ways. In one aspect, the hold open rod 202 and/or the lock mechanism 334 may be implemented consistent with U.S. patent application Ser. No. 13/397,320, filed Feb. 15, 2012 (title—"Hold Open Rod Vibration Dampening System") owned by the assignee of the disclosure and incorporated by reference herein in its entirety.

The hold open rod 202 and/or the lock mechanism 334 may be implemented a number of different ways. In one aspect, the hold open rod 202 and/or the lock mechanism 334 may be implemented consistent with U.S. patent application Ser. No. 13/345,239, filed Jan. 6, 2012 (title—"Internal Locking Mechanism For A Hold Open Rod") owned by the assignee of the disclosure and incorporated by reference herein in its entirety.

Accordingly, the disclosure has disclosed a cable release system for a hold open rod mechanism that may be remotely operated for unlocking a hold open rod mechanism. The disclosure has also disclosed a cable release system for a latch mechanism for remotely operating a latch mechanism. The disclosure has also disclosed a cable release system for a latch mechanism or a hold open rod mechanism for remotely operating a latch mechanism or a hold open rod mechanism to reduce the need for personnel to mount a ladder or other structure to reach the unlocking mechanism, which increases safety in operation of the unlocking mechanism. Moreover, the disclosure has also disclosed a cable release system for a latch mechanism or a hold open rod mechanism for remotely operating a latch mechanism or a hold open rod mechanism that allows for quick and efficient operation of the unlocking mechanism to place the component in the closed position.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise. It is to be understood that the features of the various aspects described herein may be combined with each other, unless specifically noted otherwise.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A cable release system configured to unlock a hold open rod mechanism or latch mechanism, comprising:
    an actuator having a handle and a cable attachment;
    a cable connected at one end to the actuator and at another end to an unlocking mechanism connected to the hold open rod mechanism or the latch mechanism;
    the actuator configured to move the cable and operate the unlocking mechanism connected to the hold open rod mechanism or the latch mechanism;
    the actuator and the handle being configured to be moved by personnel to move the cable and operate the unlocking mechanism associated with the hold open rod mechanism or the latch mechanism;
    an actuation shaft connected to the handle and further connected to the cable attachment;
    the cable attachment comprising a slide and a release slide;
    the cable attachment, the slide, and the release slide being configured to securely attach to the cable; and
    the release slide configured to move in a first direction with respect to the slide in order to release the cable.

2. The cable release system according to claim 1 further comprising a mounting bracket configured to mount the actuator to a surface.

3. The cable release system according to claim 1 wherein the release slide being further configured with a spring configured to urge and move the release slide in a second direction with respect to the slide in order to securely hold the cable.

4. The cable release system according to claim 3 wherein the actuator is further configured with a spring to urge the actuation shaft in a first direction to place the actuator in a non-unlocking configuration.

5. The cable release system according to claim 4 wherein:
    the actuator is further configured to move against a force of the spring to move the actuation shaft in a second direction to place the actuator in an unlocking configuration; and
    the actuation shaft further including a slot and a set screw to limit an operational movement of the actuator.

6. The cable release system according to claim 5 wherein:
    the actuator is configured to be arranged at a lower position and the hold open rod mechanism or the latch mechanism are configured to be arranged at an elevated position; and
    the elevated position is vertically higher than the lower position.

7. An aircraft system comprising the cable release system according to claim 1 and the hold open rod mechanism, the hold open rod mechanism comprising:
    an inner tube assembly coupled to an outer tube assembly, the inner tube assembly movable within the outer tube assembly.

8. The aircraft system of claim 7 implemented in a hold open rod further comprising:
    a collar having a locking slot; and
    a locking dog configured to engage the locking slot when the hold open rod is in a locked configuration.

9. The aircraft system of claim 8 implemented in the hold open rod further comprising a spring located within the collar configured to engage the collar.

10. A movable aircraft structure comprising the aircraft system of claim 7.

11. A cable release system configured to unlock a hold open rod mechanism or latch mechanism, comprising:
    an actuator having a handle and a cable attachment;
    a cable connected at one end to the actuator and at another end to an unlocking mechanism connected to the hold open rod mechanism or the latch mechanism;
    the actuator configured to move the cable and operate the unlocking mechanism connected to the hold open rod mechanism or the latch mechanism;

the actuator and the handle being configured to be moved by personnel to move the cable and operate the unlocking mechanism associated with the hold open rod mechanism or the latch mechanism;

an actuation shaft connected to the handle and further connected to the cable attachment;

the cable attachment comprising a slide and a release slide;

the cable attachment, the slide, and the release slide being configured to securely attach to the cable;

the release slide configured to move in a first direction with respect to the slide in order to release the cable; and the release slide being further configured to move in a second direction with respect to the slide in order to securely hold the cable.

12. The cable release system according to claim 11 further comprising a mounting bracket configured to mount the actuator to a surface.

13. The cable release system according to claim 11 wherein the release slide being further configured with a spring configured to urge and move the release slide in the second direction with respect to the slide in order to securely hold the cable.

14. The cable release system according to claim 13 wherein the actuator is further configured with a spring to urge the actuation shaft in a first direction to place the actuator in a non-unlocking configuration.

15. The cable release system according to claim 14 wherein:

the actuator is further configured to move against a force of the spring to move the actuation shaft in a second direction to place the actuator in an unlocking configuration; and the actuation shaft further including a slot and a set screw to limit an operational movement of the actuator.

16. The cable release system according to claim 15 wherein:

the actuator is configured to be arranged at a lower position and the hold open rod mechanism or the latch mechanism are configured to be arranged at an elevated position; and the elevated position is vertically higher than the lower position.

17. An aircraft system comprising the cable release system according to claim 11 and the hold open rod mechanism, the hold open rod mechanism comprising:

an inner tube assembly coupled to an outer tube assembly, the inner tube assembly movable within the outer tube assembly.

18. The aircraft system of claim 17 implemented in a hold open rod further comprising:

a collar having a locking slot; and a locking dog configured to engage the locking slot when the hold open rod is in a locked configuration.

19. The aircraft system of claim 18 implemented in the hold open rod further comprising a spring located within the collar configured to engage the collar.

20. A movable aircraft structure comprising the aircraft system of claim 17.

* * * * *